United States Patent [15] 3,678,736
May [45] July 25, 1972

[54] MACHINE WITH IMPROVED OPERATING HEAD TRAVERSING WORKPIECES WITH CURVED SURFACES

[72] Inventor: Harley E. May, Cincinnati, Ohio
[73] Assignee: General Electric Company
[22] Filed: Aug. 3, 1970
[21] Appl. No.: 60,690

[52] U.S. Cl. .................................... 73/67.8 S, 73/71.5
[51] Int. Cl. ............................................. G01n 24/00
[58] Field of Search ................ 73/67.8, 67.8 S, 71.5

[56] References Cited

UNITED STATES PATENTS

| | | | |
|---|---|---|---|
| 3,534,591 | 10/1970 | Phelan | 73/71.5 X |
| 3,504,534 | 4/1970 | Mandula | 73/71.5 |
| 3,086,390 | 4/1963 | Brown | 73/67.8 S |
| 2,989,864 | 6/1961 | Bamford | 73/67.8 S |

*Primary Examiner*—Richard C. Queisser
*Assistant Examiner*—Arthur E. Korkosz
*Attorney*—Edward S. Roman, Derek P. Lawrence, Frank L. Neuhauser, Oscar B. Waddell and Joseph B. Forman

[57] ABSTRACT

An ultrasonic inspection machine is disclosed. The ultrasonic transducer is mounted in an operating head which is pivoted in two planes to maintain it perpendicular to the surface of a cambered blade as the head is traversed lengthwise and widthwise over the blade surface. The support for the blade is raised and lowered to maintain a desired spacing between it and the head as the latter is traversed.

10 Claims, 6 Drawing Figures

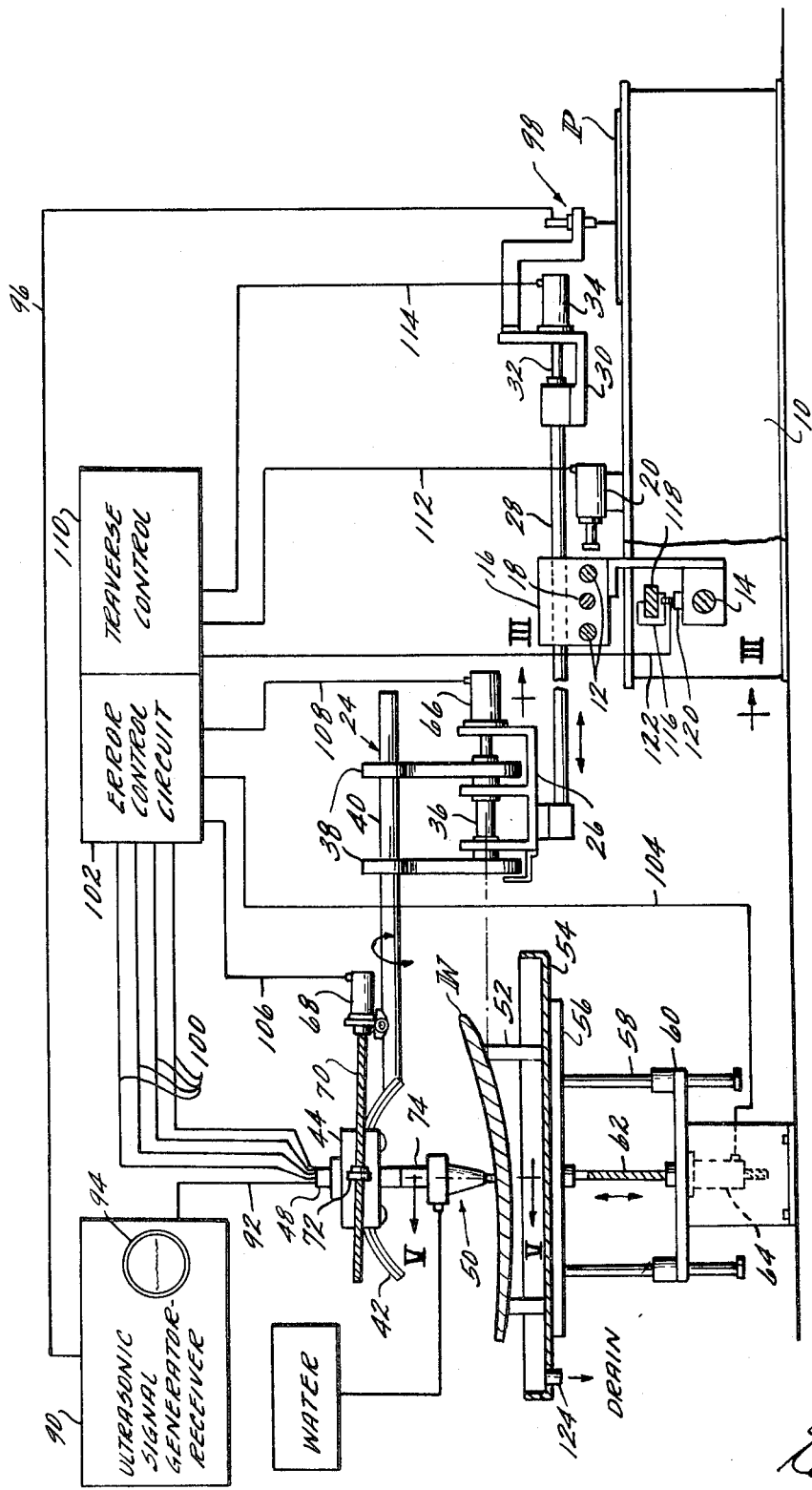

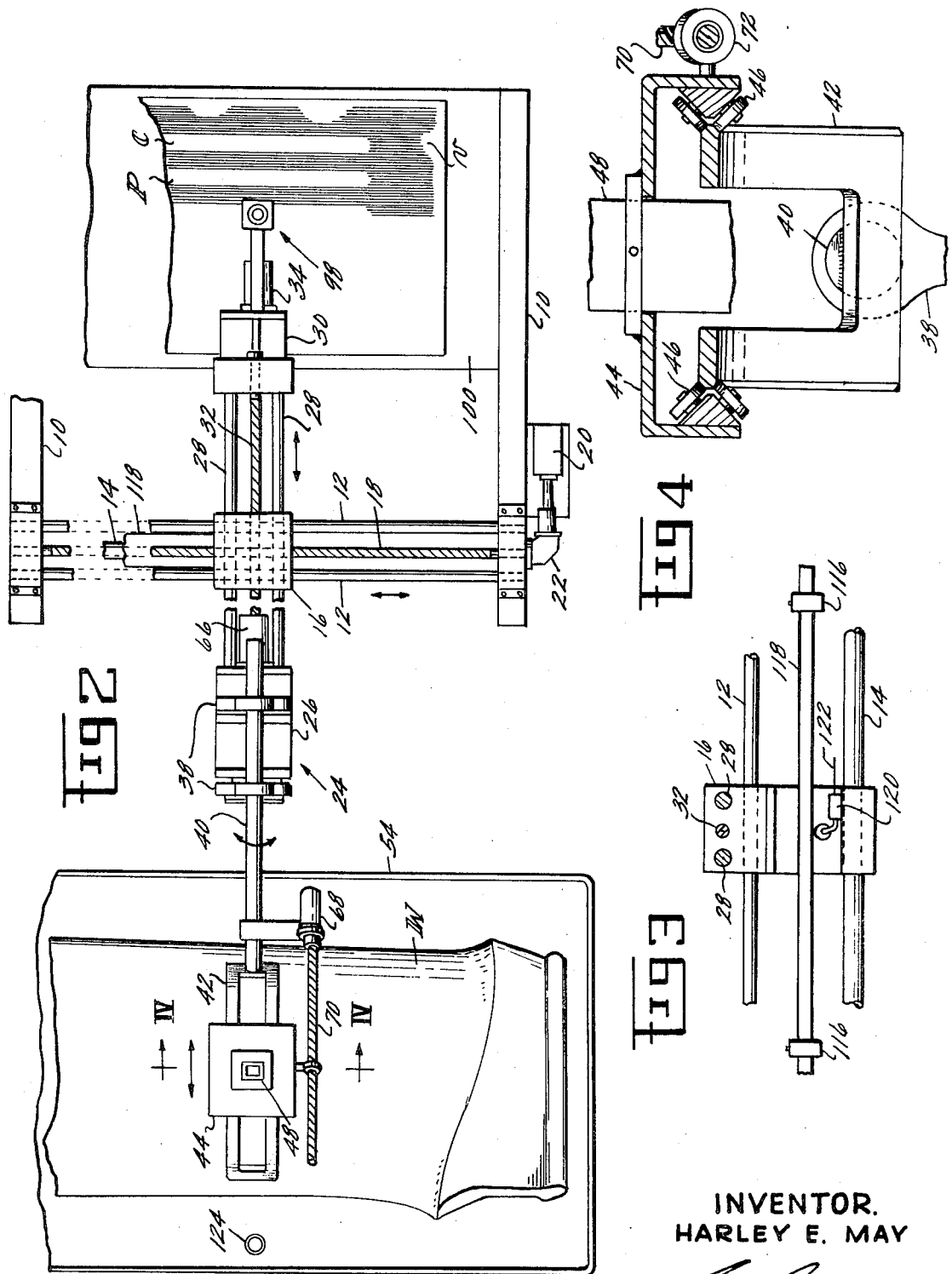

Patented July 25, 1972
3,678,736
3 Sheets-Sheet 3
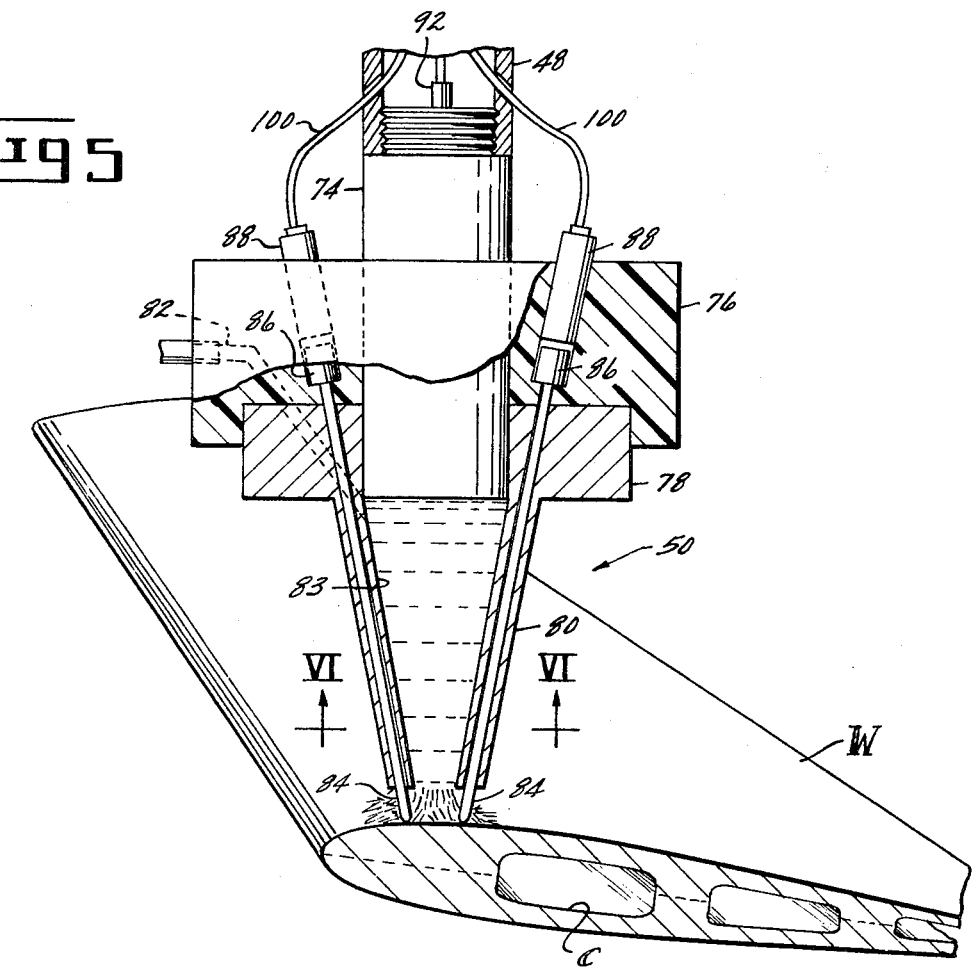
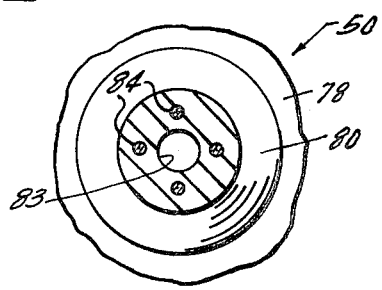
INVENTOR.
HARLEY E. MAY
ATTORNEY

MACHINE WITH IMPROVED OPERATING HEAD TRAVERSING WORKPIECES WITH CURVED SURFACES

The present invention relates to improvements in machines having an operating head which is traversed relative to a workpiece.

While the broader aspects of the invention deal generally with traversing an operating head relative to a workpiece, the motivating application of the invention is in the field of ultrasonic inspection of workpieces. Ultrasonic inspection techniques are well known and highly developed. Broadly speaking, they involve transmitting a signal from a transducer, through a liquid couplant, to a workpiece. This signal will be reflected by any surface it encounters on or in the workpiece. Means are available to identify signal reflection or lack thereof from internal surfaces which in turn can be identified as internal flaws. This form of nondestructive testing or inspection is highly useful in assuring the desired quality of castings and bonded or welded items wherein imperfect processes could cause internal imperfections which are not otherwise ascertainable.

In such ultrasonic inspection, it is essential that the operating head of the machine which carries the transducer be maintained perpendicular to and in spaced relation from the surface of a workpiece with a high degree of accuracy. These requirements have greatly hindered use of ultrasonic inspection for workpieces having curved surfaces. An example of prime concern is found in the inspection of cambered airfoil blades used in axial flow compressors and turbines. Nondestructive inspection of these blades is of vital concern, particularly where they are used in gas turbine engines employed for propulsion of aircraft.

Accordingly, one object of the invention is to facilitate ultrasonic inspection of cambered airfoil blades.

Another and broader object of the invention is to provide improved means for scanning the surface of a workpiece with an operating head while maintaining a desired angular relationship to and spacing from the surface of the workpiece.

These ends are broadly attained by a machine comprising an operating head and a support for a workpiece having a curved surface. Means are provided for imparting relative movement between the operating head and the work support in mutually perpendicular, $x$, $y$, and $z$ directions, the last direction being generally normal to the surface of the curved workpiece. When movement is initiated in the $x$ and $y$ directions, sensing means detect changes in the head from a desired angular relationship with the workpiece and maintain this relationship. Additionally, means are provided for detecting changes in the desired spacing between the operating head and the workpiece surface and initiating $z$ direction movement to restore a desired spacing as the workpiece is scanned in the $x$ and $y$ directions.

In a preferred form, the operating head comprises an ultrasonic transducer and a water-filled passageway providing a liquid couplant between the transducer and the surface of the workpiece.

The above and other related objects and features of the invention will be apparent from a reading of the following description of the disclosure found in the accompanying drawings and the novelty thereof pointed out in the appended claims.

In the drawings:

FIG. 1 is an elevation with portions broken away of a machine embodying the present invention;

FIG. 2 is a plan view, with portions broken away, of the machine seen in FIG. 1;

FIG. 3 is a section, on an enlarged scale, taken on line III—III in FIG. 1;

FIG. 4 is a view, on a further enlarged scale, taken on line IV—IV in FIG. 2;

FIG. 5 is a section, on an enlarged scale, taken on line V—V in FIG. 1 with the workpiece W rotated 90° and illustrated in perspective; and FIG. 6 is a section taken on line VI—VI in FIG. 5.

Referencing FIGS. 1 and 2, the present machine comprises a pair of spaced frame members 10 between which an upper pair of guide rods 12 and a lower guide rod 14 extend. A carriage 16 is slidably mounted on these guide rods and is traversed therealong, in what is herein referenced as the $x$ direction, by an elongated screw 18 which is journaled at its opposite ends on the frame 10. An electrical motor 20 is mounted on one of the frames 10 and, through a gear connection 22, rotates the screw 18 in a manner later described.

A cross slide 24 is mounted on the carriage 16 and comprises a frame 26 connected to one end of a pair of guide rods 28 which are slidably mounted on the carriage 16 transverse to the guide rods 12. Another frame 30 is connected to the opposite ends of the guide rods 28. An elongated screw 32 is journaled at its opposite ends in the frame 26 and 30 and is threadably connected to the carriage 16. A motor 34 is mounted on the frame 30 and drives the screw 32 to traverse the cross slide 24 in what is herein referenced as the $y$ direction.

A shaft 36 is journaled on the cross slide frame 26 and has arms 38 projecting upwardly therefrom. A shaft 40 extends from the arms 38 and has an arcuate track 42 at its outer end. A slide 44 is mounted on the track 42 by rollers 46 (FIG. 4). A post 48 projects through the slide 44 and has an operating head 50 mounted at its lower end (FIGS. 1 and 5). The operating head 50 is positioned relative to a workpiece W in a manner later described in detail. Workpiece W, in this instance, is illustrated as a cambered airfoil blade of the type employed in the compressor section of a gas turbine engine. The workpiece W is supported by pins 52 projecting upwardly from a pan 54 and may be positively clamped, by means not shown, if desired. The pan 54 is supported by a plate 56 and posts 58 which are slidably received by a frame 60. Additionally, an elongated screw 62 is journaled at its upper end on plate 56 and threadably received by the frame 60. A motor 64 is mounted on the frame 60 to rotate the screw 62 and adjust the vertical position of the workpiece supported in the tray 54, this being herein referenced as $z$ direction movement. The operating head 50 may be positioned in a universal angular fashion relative to the workpiece by sliding the slide 44 along the track 42 displacing the head in a $y$ plane perpendicular to the $x$ direction and by rotating the shaft 36 to angularly displace the head in an $x$ plane perpendicular to the $y$ direction of movement. The latter function is provided by a motor 66 mounted on the cross slide frame 26 to pivot the shaft 36, and the former function is provided by a motor 68 which is pivotally mounted on the shaft 40. The motor 68 drives an elongated screw 70 which is threadably received by a block 72 which, in turn, is pivotally mounted on the slide 44.

It will also be noted that the $x$ and $y$ planes intersect essentially at the upper surface of the workpiece coincident with the central, longitudinal axis of the operating head 50. This will be evident from FIG. 1 which shows the axis of shaft 36, the axis of the head 50 and the center of generation of the track 42 all intersecting at a point on the upper surface of the workpiece W.

The operating head 50 (FIG. 5) comprises an ultrasonic transducer 74 which is threaded into the lower end of the post 48. A block 76, formed of insulating material is secured to the transducer 74. A plate 78 is secured to the block 76 and has a hollow, frusto-conical nose 80 projecting downwardly therefrom with its lower surface in closely spaced relation with the upper surface of the workpiece W. A passageway 82 is formed in the block 76 and plate 78 and leads to a central passageway 83 which extends from the transducer 74 to the lower surface of the nose 80. The passageway 82 is connected to a suitable source of pressurized water. Four sensor pins 84 are slidably mounted in the nose 80 and project from its lower surface a short distance into contact with the workpiece W. The pins 84 have enlarged heads 86 formed at their upper ends within the insulated material block 76. Eddy current probes 88 are mounted in the block 76 in spaced relation from the upper ends of the pin heads 86.

Two of the pins 84 are disposed in the referenced y plane and are equally spaced on opposite sides of the longitudinal axis of the operating head 50. The other two pins are disposed in the referenced x plane and are equally spaced on opposite sides of the longitudinal axis of the operating head 50.

The ultrasonic portions of the present machine may be of conventional design and include an ultrasonic signal generator/receiver 90 which is connected to the transducer 74 by coaxial cable 92 which extends upwardly through the post 48. The signal output of the generator/receiver 90 may be displayed on a cathode ray tube 94 and also may be connected as by wire 96 to a C-scan device 98 which provides a record of the signal on electro-sensitive paper P which is supported on a table 100 extending between the frames 10. Other forms of read-out may also be provided.

Each of the eddy current probes 88 generates a signal having a strength proportionate to the distance of the aligned pin head 86 therefrom. This signal is transmitted from the probe 88 to an error control circuit 102 by a lead 100 which also energizes the probe. The circuit 102 performs three error signal generating functions. First, it compares the signal from one of the probes 88 against a reference value representative of a desired spacing between the lower end of the nose 80 and the surface of the workpiece. When this spacing is established, the pin head 86 is in an intermediate position and its spacing from the probe results in a probe signal of equal magnitude and opposite polarity relative to the reference signal. A deviation in the desired probe spacing causes a change in the generated signal and an error signal output from the circuit 102. Such signal has a polarity indicative of the direction of deviation and a strength indicative of the magnitude of the deviation. This signal is connected to motor 64 by a lead 104 and causes the motor to rotate in the proper direction to displace the workpiece in the z direction and correct the deviation at a rate proportionate to the magnitude of the deviation.

Another function of the circuit 102 is to detect variations in the angular relationship of the axis of the head, in the y plane, from a perpendicular relationship to the surface of the workpiece and, more specifically, the tangent of that surface. To this end, the leads of the two probes lying in the y plane are connected to the circuit 102 and their signals are compared. When both are equal, the desired angular relationship exists and there is no output signal. When a variation from perpendicularity exists, the spacing of this pair of pin heads will be different and the resultant difference in probe signals will generate an error output signal having a polarity indicative of the direction in which there is a deviation from perpendicularity and a magnitude indicative of the magnitude of this deviation. The y plane error signal is transmitted by lead 106 to the motor 68 and causes it to rotate the screw 70 in the proper direction to move the slide 44 along the arcuate track 42 and correct the deviation. The rate of rotation of the motor 68 is proportionate to the magnitude of the deviation.

The third error signal function of control circuit 102 is essentially the same as that just previously described except that it is the signal indicating a deviation of the axis of the operating head from perpendicularity with the surface of the workpiece W in the x plane. Thus the leads 100 of the probes 88, in the x plane, are connected to the circuit 102 and the error output signal is transmitted by lead 108 to motor 66. The motor 66, dependent upon the polarity of this signal, rotates the shaft 36, and with it the head 50, in the proper direction to correct the deviation from perpendicularity. Again, the rate of rotation of the motor 66 may be proportionate to the magnitude of the error signal.

The design details of the error control circuit 102, to perform the described functions, are well within the abilities of those skilled in the art. For this reason, specific circuit components and connections have not been described.

OPERATION

The table 54 is lowered by actuating an override control in the circuit 102 which rotates the motor 64 in the proper direction. The workpiece W is then placed on the supporting pins 52 and may be clamped in place if desired. Upon release of the override, the head 50 is automatically positioned in the desired spacing from the surface of the workpiece and perpendicular thereto through the described error control circuit 102.

The motors 20 and 34 are controlled by a traverse control 110 having leads 112, 114 connected respectively thereto. The traverse control includes overrides which permit the sensing head to be positioned initially at one corner of the workpiece. After being so positioned, the traverse control (of conventional design) is set into automatic operation. The motor 20 rotates to turn the screw 18 and advances the carriage 16 (and with it the operating head 50) in the x direction. Adjustable stops 116 are spaced apart on a bar 118 which extends between the frames 10. A switch 120 (on carriage 16, FIG. 3) engages one of the stops 116 at one extreme of travel in the x direction. A lead 122 carries the switch signal to the traverse control 110 and causes incremental rotation of the motor 34 to index the operating head 50 in the y direction. The switching signal also actuates the traverse control 110 to reverse the direction of rotation of the motor 20 so that the carriage 16 and head 50 will reverse their movement in the x direction. This reverse movement will continue until the switch 120 engages the other stop 116 whereupon the switching signal will cause the traverse control 110 to again incrementally rotate the motor 34 to index the same y direction and also to reverse the direction of rotation of the motor 20. The operating head may continue to traverse in this fashion until the entire surface of the workpiece is scanned.

Before traversing is initiated, the water supply to the sensing head is opened so that there is a continuous water column or couplant, in passageway 83, between the transducer 74 and the workpiece W. The water escaping from the space between the nose 80 and the workpiece is caught in the pan 54 and disposed of through a drain 124.

The illustrated workpiece W is a cambered airfoil blade of the type used in axial flow compressors. This blade has been formed by diffusion bonding two halves which are joined at the median camber line of the blade, as indicated by the broken line in FIG. 5. This process enables internal cavities c to be formed for a lightweight construction.

The ultrasonic signal generator/receiver 94 is programmed to detect voids at the bond line (broken line) between the two halves of the blade. Such voids would indicate that the bonding process was not effective in a given area. Dependent upon the size and location of the void, the blade may be rejected. If no voids are found in the bonded area during the inspection process, the blade is acceptable.

During traversing of the operating head 50 in the x and y directions, the head is maintained perpendicular to the constantly changing contour of its surface through the described operation of the motors 66, 68. The sensing head is maintained in predetermined spaced relation from the surface of the blade which varies in a height-wise sense by the described operation of the motor 64.

This perpendicularity and spaced relationship is necessary for detection of voids at the bond surface. The described machine provides a means for automatically scanning the blade to locate such voids as might exist. Identification of the voids may be made visually from the cathode ray tube 94 and from the printout of the "C" scan device 98 on the paper P. This printout is illustrated in FIG. 2. Interruptions in the solid trace lines indicate a void, as at v. The large interruptions, however, are the areas of the cavities c which have purposely been formed in the blade.

Many variations in the preferred embodiment, which has been described, will occur to those skilled in the art within the spirit and scope of the present inventive concepts. Particularly, it should be noted that the various movements in the x, y and z directions as well as the angular movements are relative. That is, the operating head, for example, could be fixed and the table 54 manipulated to perform the described inspection function.

Further, in the broader aspects of the invention, the operating head 50 could employ different inspection techniques, eddy current for example, or even perform other operations on the workpiece as it traverses its surface.

The scope of the present inventive concepts is therefore to be derived solely from the following claims.

Having thus described the invention, what is claimed as novel and desired to be secured by Letters Patent of the United States is:

1. A machine including:
   an operating head having a longitudinal axis,
   a support for a workpiece having a curved surface,
   means for imparting relative movement between the operating head and support in mutually perpendicular X, Y and Z directions, the last direction being generally normal to the curved surface of the workpiece,
   means for sensing changes of the operating head from a predetermined angular relationship with the surface of the workpiece including at least one pair of sensors respectively disposed on opposite sides of the longitudinal axis of the operating head in the Y plane and at least one pair of sensors respectively disposed on opposite sides of the longitudinal axis of the operating head in the X plane, each of said sensors including means for detecting changes in distance from the workpiece surface and the operating head,
   means responsive to said angular sensing means for imparting relative angular movement between the workpiece support and the operating head in a direction tending to maintain the predetermined angular relationship during relative movement in the X and Y directions,
   means for sensing changes in the spacing between the operating head and the workpiece from a predetermined spacing,
   means responsive to the spacing sensing means for initiating Z direction relative movement in a direction to restore said predetermined spacing during said relative movement in the X and Y directions.

2. A machine as in claim 1 wherein the means for imparting angular movement include
   separate means for imparting relative pivotal movement between the operating head and the workpiece in x and y planes respectively, said planes being respectively perpendicular to the y and x directions.

3. A machine as in claim 2 wherein the means for imparting relative movement in the x and y directions includes
   means for imparting to-and-fro relative movement in the x direction and incremental relative movement in the y direction at each extreme of movement in the x direction.

4. A machine as in claim 2 wherein:
   the x and y planes and the longitudinal axis of the operating head intersect at a point essentially on the upper surface of the workpiece.

5. A machine as in claim 2 wherein
   the X plane pivoting means are responsive to differences in the distances sensed by the X plane sensors and
   the Y plane pivoting means are responsive to differences in the distances sensed by the Y plane sensors.

6. A machine as in claim 5 wherein:
   each sensor comprises a pin projecting beyond the end of the operating head into engagement with the surface of the workpiece and means for providing a signal indicating the relative position of the pin to the operating head as it engages the workpiece surface.

7. A machine as in claim 5 wherein:
   the angular sensing means includes means for generating error signals respectively indicating differences between the distances sensed by each sensor of each respective pair and a polarity indicative of which sensor of each respective pair sensed a greater distance and
   the means for sensing changes in the spacing between the operating head and the workpiece include means for generating an error signal, from one of the sensor signals, having a polarity indicative of the direction of change of distance from the desired spacing.

8. A machine as in claim 6 wherein
   the operating head includes an ultrasonic transducer, and a conical nose section having a passageway from the transducer to the lower surface of the operating head,
   means for supplying water to this passageway to provide a couplant between the transducer and the surface of the workpiece,
   the sensing pins are angled toward the passageway opening in the lower surface of the operating head, and
   the predetermined angular relationship between the surface of the workpiece and the axis of the head is perpendicularity.

9. A machine as in claim 1 wherein means are provided for moving the workpiece support in the z direction to provide z direction relative movement, and
   the sensing head mounted on a cross slide and the cross slide is mounted on a carriage and means are provided for moving the cross slide in the y direction relative to the carriage and moving the carriage in the x direction relative to the workpiece support to provide said x and y relative movement, and
   the means for imparting angular movement include
   a shaft rotatably mounted on the cross slide and having its axis parallel to the y direction and intersecting the surface of the workpiece and the longitudinal axis of the operating head,
   said shaft having an arcuate track formed about a radius swung from said point of intersection,
   a slide mounted on said arcuate track with the operating head mounted on said slide,
   means responsive to said angular sensing means for pivoting said shaft and moving said slide along said arcuate guide, and
   further wherein the angular sensing means include a pair of sensors respectively disposed on opposite sides of the longitudinal axis of the operating head in the y plane and a pair of sensors respectively disposed on opposite sides of the longitudinal axis of the operating head in the x plane, each of said sensors including means for detecting changes in distance from the workpiece surface and the operating head,
   means for generating error signals respectively indicating differences in the distances sensed by each pair of sensors and
   means connecting the y plane error signal to the means for moving said slide along said arcuate guide and connecting the x plane error signal to the means for pivoting said shaft.

10. A machine as in claim 9 wherein:
    the operating head includes an ultrasonic transducer, a nose section having a passageway from the transducer to the lower surface thereof,
    means for supplying water to this passageway to provide a couplant between the transducer and the surface of the workpiece, and
    further wherein each sensor comprises a pin slidably mounted in said conical nose section and angled toward the passageway opening in the lower surfaces of the operating head and
    the predetermined relationship between the surface of the workpiece and the axis of the head is perpendicularity.

* * * * *